(12) United States Patent
Kirkpatrick (10) Patent No.: US 7,200,425 B1
(45) Date of Patent: *Apr. 3, 2007

(54) DEVICE AND METHOD FOR AUGMENTING CELLULAR TELEPHONE AUDIO SIGNALS

(75) Inventor: Mark Kirkpatrick, Conyers, GA (US)

(73) Assignee: BellSouth Intellectual Property Corp., Wilmington, DE (US)

(*) Notice: Subject to any disclaimer, the term of this patent is extended or adjusted under 35 U.S.C. 154(b) by 353 days.

This patent is subject to a terminal disclaimer.

(21) Appl. No.: 10/101,630

(22) Filed: Mar. 21, 2002

Related U.S. Application Data (63) Continuation-in-part of application No. 09/964,385, filed on Sep. 28, 2001.

(51) Int. Cl.
H04B 1/38 (2006.01)

(52) U.S. Cl. .................. 455/572; 455/575.1; 455/90.3; 455/401

(58) Field of Classification Search ................ 455/90.1, 455/90.3, 572–573, 575.1, 401, 556.1–556.2, 455/557–559, 567, 566.1, 566.2; 379/373.01–373.02, 379/373.03–373.04, 374.01–374.02; 340/7.2, 340/7.53, 7.62, 636.1, 636.16, 7.32
See application file for complete search history.

(56) References Cited

U.S. PATENT DOCUMENTS

| | | | |
|---|---|---|---|
| 5,251,329 A * | 10/1993 | Takagi et al. | 455/572 |
| 5,452,354 A * | 9/1995 | Kyronlahti et al. | 379/373.02 |
| 5,767,778 A * | 6/1998 | Stone et al. | 340/636.1 |
| 6,094,587 A * | 7/2000 | Armanto et al. | 455/567 |
| 6,244,894 B1 * | 6/2001 | Miyashita | 439/500 |
| 6,501,967 B1 * | 12/2002 | Makela et al. | 455/567 |
| 6,556,665 B1 * | 4/2003 | Suzuki et al. | 379/88.1 |
| 6,597,279 B1 * | 7/2003 | Haraguchi | 340/7.2 |
| 6,600,098 B2 * | 7/2003 | Mizuno et al. | 84/622 |
| 6,810,274 B2 * | 10/2004 | Sawada et al. | 455/572 |
| 2001/0014616 A1 | 8/2001 | Matsuda | |
| 2001/0016483 A1 * | 8/2001 | Nakajima | 455/406 |

(Continued)

FOREIGN PATENT DOCUMENTS

EP  1111885 A1 *  6/2001

(Continued)

OTHER PUBLICATIONS

U.S. Appl. No. 09/964,389, Kirkpatrick.

(Continued)

Primary Examiner—Melur Ramakrishnaiah
(74) Attorney, Agent, or Firm—Withers & Keys, LLC (57) ABSTRACT

A system and method is described for augmenting cellular telephone signals for a cellular telephone. In an exemplary embodiment, a cellular battery is equipped with a sound generating device that stores one or more audio signals that are activated upon receipt of a telephone call. Optionally, the battery may store a library of audio signals that may be programmable and edited. The system and method of the present invention enables a user to choose audio alert sounds beyond the scope of those provided by the manufacturer of a cellular telephone. A removable memory device containing at least one accessible sound file is attachable to the battery or telephone body, and provides increased selection of audio signal choices.

20 Claims, 3 Drawing Sheets

U.S. PATENT DOCUMENTS

| | | |
|---|---|---|
| 2001/0041590 A1 | 11/2001 | Silbufenig |
| 2001/0044331 A1 | 11/2001 | Miyoshi |
| 2002/0019250 A1 | 2/2002 | Le-Faucheur |
| 2002/0111189 A1 | 8/2002 | Chou |
| 2002/0160751 A1 | 10/2002 | Yingju |
| 2002/0186122 A1* | 12/2002 | Gehlot .................. 340/7.58 |
| 2003/0008646 A1 | 1/2003 | Shanahan |
| 2003/0032415 A1 | 2/2003 | Cho |
| 2003/0176206 A1 | 9/2003 | Taniguchi |

FOREIGN PATENT DOCUMENTS

| | | |
|---|---|---|
| JP | 02001069199 A * | 3/2001 |

OTHER PUBLICATIONS

U.S. Appl. No. 10/101,724, Kirkpatrick.

* cited by examiner

DEVICE AND METHOD FOR AUGMENTING CELLULAR TELEPHONE AUDIO SIGNALS

This application is a continuation-in-part of U.S. patent application Ser. No. 09/964,385 filed Sep. 28, 2001, which is incorporated by reference herein in its entirety.

BACKGROUND

1. Field of the Invention

The present invention relates generally to battery technology used in cellular telephones. More specifically, the present invention is directed to a device and method for augmenting the choice of available cellular telephone audio signals through a programmable battery.

2. Background of the Invention

Cellular telephones, also commonly known as mobile telephones, have become increasingly utilized throughout the world. Typical signals used to alert a user of a cellular telephone of an incoming telephone call include audio signals such as ringing, visual signals such as light flashes or written messages, or touch signals such as vibration of the telephone. A combination of signals also is possible, such as, for example, a combination of audio and visual signals.

When a cellular telephone provides audio signals, the user typically has a limited number of pre-selected audio signal selections (which may include standard rings, musical tones, or melodies) already programmed into the telephone. Many conventional telephones do not have the ability to introduce additional audio alert signals. Thus, the user is confined to a limited group of audio alert signals that a manufacturer has pre-programmed into the telephone. Although some telephone systems allow a user to download additional audio alert signals into the telephone, such additional signals typically are provided only by the manufacturer, and are merely an expansion of the original limited inventory of audio signals available to a user. Thus, the user is still confined to a set of audio signals that a manufacturer provides to its users. The user does not have the ability to use audio signals of her own choice, such as, for example, a favorite song or melody, sounds of nature, or voice sounds of a child or a pet or the voice of the user herself.

Thus, there is a need for an economical but flexible device and method that enables a user to easily program any type of audio sounds into a cellular telephone and allow such audio sounds to be designated as the incoming telephone call audio alert signal.

SUMMARY OF THE INVENTION

The present invention overcomes the drawbacks of conventional cellular telephone audio alert signals by providing a device and method that enables the user to enter audio signals of his or her own choice to use as audio alert signals for the telephone.

As used throughout this disclosure, the term "augmenting", when used in reference with cellular telephone audio signals, refers to an increase in choices that a user has for audio alert signals. Thus, an increase in choices of alert signals beyond that provided by a manufacturer is an augmenting of cellular telephone audio signals.

As used throughout this disclosure, the term "sound generating device" is any assembly that is capable of storing sound files, retrieving sound files, and playing sound files. Thus, such a device typically is piezoelectric and contains software to enable a stored sound file to be played, necessary EPROM, ROM and/or RAM memories, and a small speaker. Such sound generating devices typically are used in toys and musical cards.

In accordance with an exemplary embodiment, the present invention provides a battery assembly for a cellular telephone that plays sounds. The battery assembly includes a battery for providing power for a cellular telephone, and a sound generating device attached to the battery and capable of storing a sound file. Thus, the sound generating device is triggered to play sound when a telephone call is received. A user then can choose the type of sound she wishes to alert her of an incoming telephone call, and have the chosen telephone sound alert her of an incoming call.

In accordance with another exemplary embodiment, the present invention provides a battery assembly for a cellular telephone that includes a battery, for providing power to the cellular telephone, and a sound generating device attached to the battery and including a removable memory device for storing multiple sound files. The sound generating device can be induced to play one of the multiple sound files when a telephone call is received. The battery assembly also includes an external connector socket that provides external electrical access to the multiple sound files inside the sound generating device, and a selector device for designating a particular sound file to be the one used as audio alert signal.

In accordance with another exemplary embodiment, the present invention provides a cellular telephone system having changeable audio alert signals. The system includes a cellular telephone body and a cellular telephone battery. The battery further includes a sound generating device having a removable memory device to store a sound file. The sound generating device can be induced to play a sound file when a telephone call is detected by the cellular telephone. Alternatively, the sound generating device can store multiple sound files. Furthermore, the cellular telephone assembly may also include an external socket to provide external access to the multiple sound files saved in the sound generating device. Optionally, a computer system may be linked to the external socket to edit the multiple sound files stored in the sound generating device. Finally, a selector may allow a user to choose a particular sound file from the multiple sound files to be designated as the audio alert signal.

In yet another exemplary embodiment, the present invention provides a method of selecting a designated audio alert signal on a cellular telephone. This method involves providing a programmable battery for a cellular telephone that has a sound generating device storing multiple sound files and a selector for choosing a file among the sound files. The user can scroll through the sound files by using the selector until a desired sound file is heard. The user then stops scrolling through the sound file, and the chosen sound file is then used as the audio alert signal when incoming calls are received.

In accordance with an exemplary embodiment, the present invention provides a device and method for selectively programming a telephone with any type of sound signal to be used as an audio alert signal for incoming calls.

In another exemplary embodiment, the present invention provides a device and method that is compatible with any type of cellular telephone system.

It is therefore an object of the present invention to provide a device and method of augmenting cellular telephone audio alert signals that do not require changing the design of the telephone body itself.

These and other objects of the present invention will become apparent upon a reading of the following detailed description in conjunction with the associated drawings.

It is to be understood that both the foregoing general description and the following detailed description are exemplary and explanatory only and are not restrictive of the invention, as claimed.

The advantages and purpose of the invention will be set forth in part in the description that follows, and in part will be obvious from the description, or may be learned by practice of the invention. The advantages and purpose of the invention will be realized and attained by means of the elements and combinations particularly pointed out in the appended claims.

DETAILED DESCRIPTION OF THE INVENTION

Figure 1:
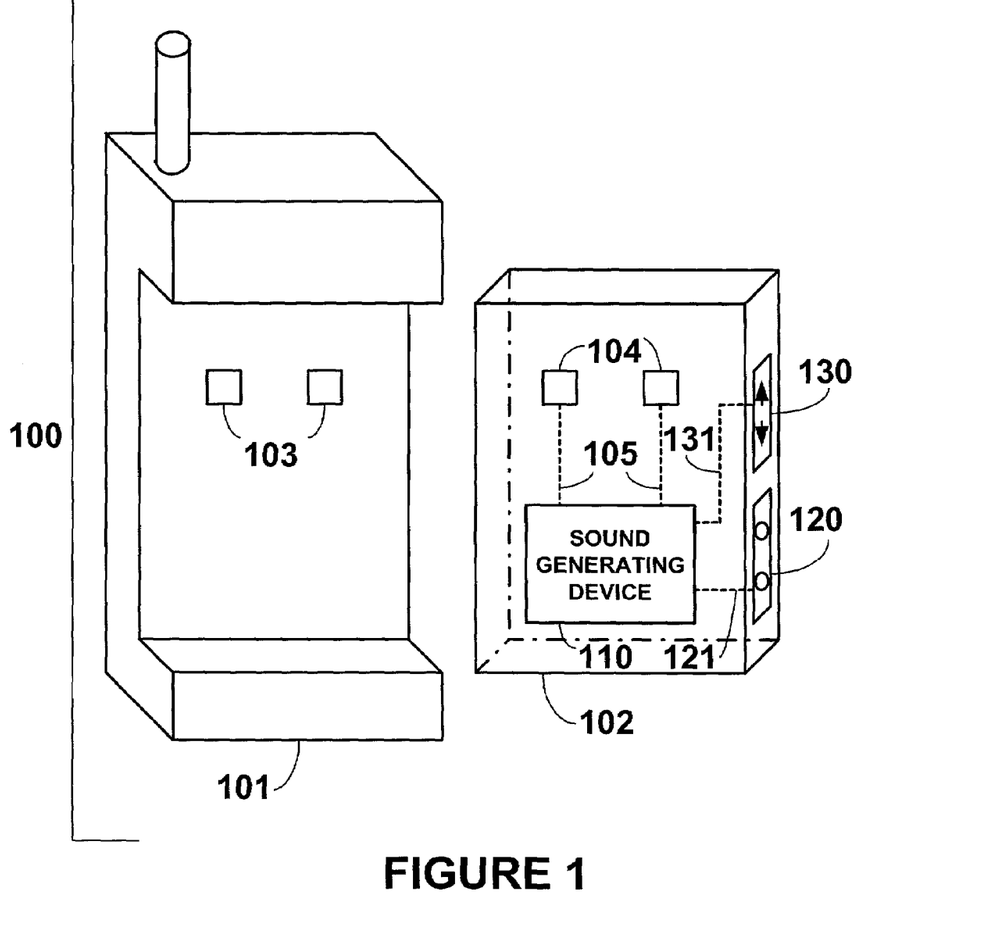
FIG. 1 illustrates a conventional cellular telephone body with a device, according to an exemplary embodiment of the present invention, that allows for a variety of audio alert signals to be used.

An exemplary embodiment of a device according to the present invention is shown in FIG. 1. The overall cellular telephone system 100 includes a conventional cellular telephone body 101 and an exemplary embodiment of a device 102 according to the present invention. The device 102 is in the form of a battery that produces sound, thereby making such a system and method of augmenting the choice of available telephone audio signals both economical and flexible.

The exemplary embodiment of the present invention shown in FIG. 1 presents an improvement based on the technology of vibrating batteries, wherein an activation signal is directed to the vibrating battery to vibrate the telephone when an incoming call is received. Thus, operation of battery 102 according to the embodiment shown in FIG. 1 also requires an incoming signal from the body of the telephone 101 to signal the battery 102 to produce an audio signal. The telephone body 101 does not have to be modified to accommodate the new sound-producing battery 102. Furthermore, the telephone 101 is merely set up as if the sound-producing battery 102 is a vibrating battery, thereby enabling the telephone body 101 to send a signal to the battery 102 when an incoming telephone call is received.

The telephone body 101 is in communication with the battery 102 through, for example, suitable terminal connectors 103 and 104, respectively. Thus, when an incoming telephone call signal is detected by the cellular telephone system 100, the telephone body 101 sends a signal to the battery 102 to activate. When the sound-producing battery 102 is taking the place of a conventional vibration battery, a sound generating device 110 incorporated in battery 102 is signaled to activate, producing a given audio alert signal. In all aspects, the telephone body 101 is conventional and only needs to notify battery 102 that an incoming telephone signal is received. Furthermore, the designated audio alert signal also may be used for other notification alarms that are available on the cellular telephone, such as appointment alarms and the like.

Sound generating device 110 may comprise, for example, a piezoelectric device for converting electronic signals to sound waves. Alternatively, it may comprise a miniature speaker or other transducer for converting electronic signals to sound waves. The sound generating device also has a memory in which the sound files can be stored. A sound chip that has all the components necessary to store, access, play, and generate sound from sound files may be used.

Battery 102 has terminal connectors 104 that communicate with sound generating device 110 through suitable electrical connectors 105. Terminal connectors 104 are also used to supply power through terminal connectors 103 to the telephone body 101. The power storage area of the battery 102 is not shown for sake of clarity. However, the power storage area of the battery 102 is also in communication with the terminal connectors 104 through suitable electrical connectors.

Sound generating device 110 may be pre-programmed with a set of audio signals that a user may use as the audio alert signal when an incoming telephone call is received. Thus, a user may purchase a battery 102 that has a list of audio alert signals pre-programmed into it. As a non-limiting example, different batteries 102 may have different themes, such as "sounds of nature", "popular songs", and "different automobile honks". When a user prefers another set of audio alert signals, she merely has to purchase another battery that provides such signals.

When a battery 102 provides a user with a list of accessible audio alert signals, the user needs a means to select a particular desired audio signal. Such a selector means to select a desired audio alert signal may be, for example, a selector switch, button, mechanical selector, touch pad, or the like. In the embodiment shown in FIG. 1, a selector switch 130 is shown that enables a user to select a desired audio alert signal by pushing up or down on selector arrows that scroll through an internal library of signals stored in sound generating device 110. In the exemplary embodiment shown in FIG. 1, pressing the up or down arrows allows the user to scroll through the selection of stored audio signals. Optionally, the user is able to hear the selections as the selections are being scrolled, so as to have an indication of which signal the battery 102 is being locked into using as the pre-selected audio alert signal. Alternatively, the selector switch 130 provides the user additional options, such as sequential and random audio alert signal selection. When sequential signal selection is chosen, each successive telephone call received will use the next sequential audio alert signal in memory. When random signal selection is chosen, each successive telephone call received will use a randomly chosen audio alert signal, as chosen by the sound generating device 110.

Alternatively, to expand the selections of audio alert signals even beyond that provided by batteries 102 having different themes, an accessing means would be beneficial to provide a user with ability to access and edit the audio signal library of the battery. Thus, such a means for accessing the signal library of the battery may be, for example, an electrical connector socket, plug, adapter, or the like. In the exemplary embodiment shown in FIG. 1, an electrical connector socket 120, which is electrically connected to the sound generating device 110 through suitable electrical connectors 121, is designed to receive a conventional two prong plug 220, such as the one shown in FIG. 2.

Although the switch 130 and the connector socket 120 are shown on a side of the battery 102 for sake of accessibility and ease of operation for a user, such placement is merely exemplary. The switch 130 and socket 120 may be placed anywhere on the battery 102 as long as they may be accessed by a user and are usable for their intended purposes.

Optionally, sound generating device 110 may be programmed with more than one audio signal. A means for programming the audio signal selection of a battery 102 is shown in the exemplary embodiment in FIG. 2 as system 200. System 200 includes a plug 220 that electrically communicates with the socket 120, and allows a computer 201 to program sound generating device 110 (not shown in FIG. 2). Computer 201 may be provided with software that allows a user to access, edit and provide input to the audio alert signal library in sound generating device 110. The computer 201 may be a desktop model with a monitor 202 and a keyboard 203, a laptop, a personal data assistant, or any other device that has the ability to electronically access a library or stored audio files in a sound generating device 110.

Figure 2:
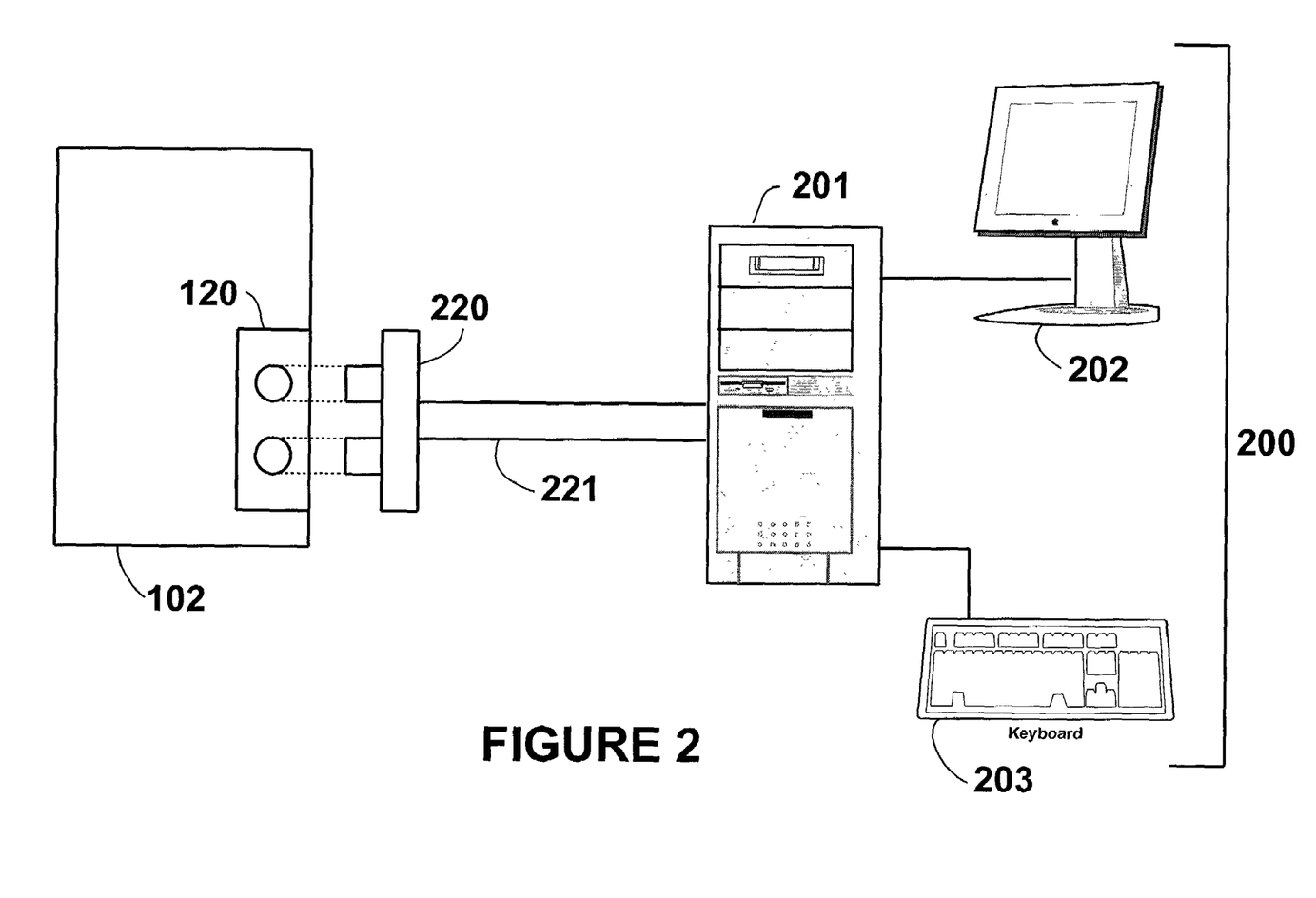
FIG. 2 illustrates an exemplary embodiment of a system and method of programming audio alert signals into a device according to the exemplary embodiment shown in FIG. 1.

Through the programming system 200, the user may add or delete sound files from the sound generating device 110. The sound files may be in any suitable format, such as, for example, MP3. A software package, provided with the audio programmable battery 102, would allow a user to arrange the order of sound signals in a given battery 102, delete any sounds signals that are no longer desired, or to add new sound signals in a given memory slot in the sound generating device 110.

Although the programming system 200 in FIG. 2 has been shown with a personal computer 201, other computers are also possible to program the alert signal library in the sound generating device 110. Such other computers include, but are not limited to, laptop computers, personal data assistants, suitable interactive paging systems, or the like. A telephone body 101 itself may be additionally programmed by its manufacturer to be able to scroll through, access, and edit alert signals in the signal library of a sound generating device 110 in a battery 102.

Figure 3:
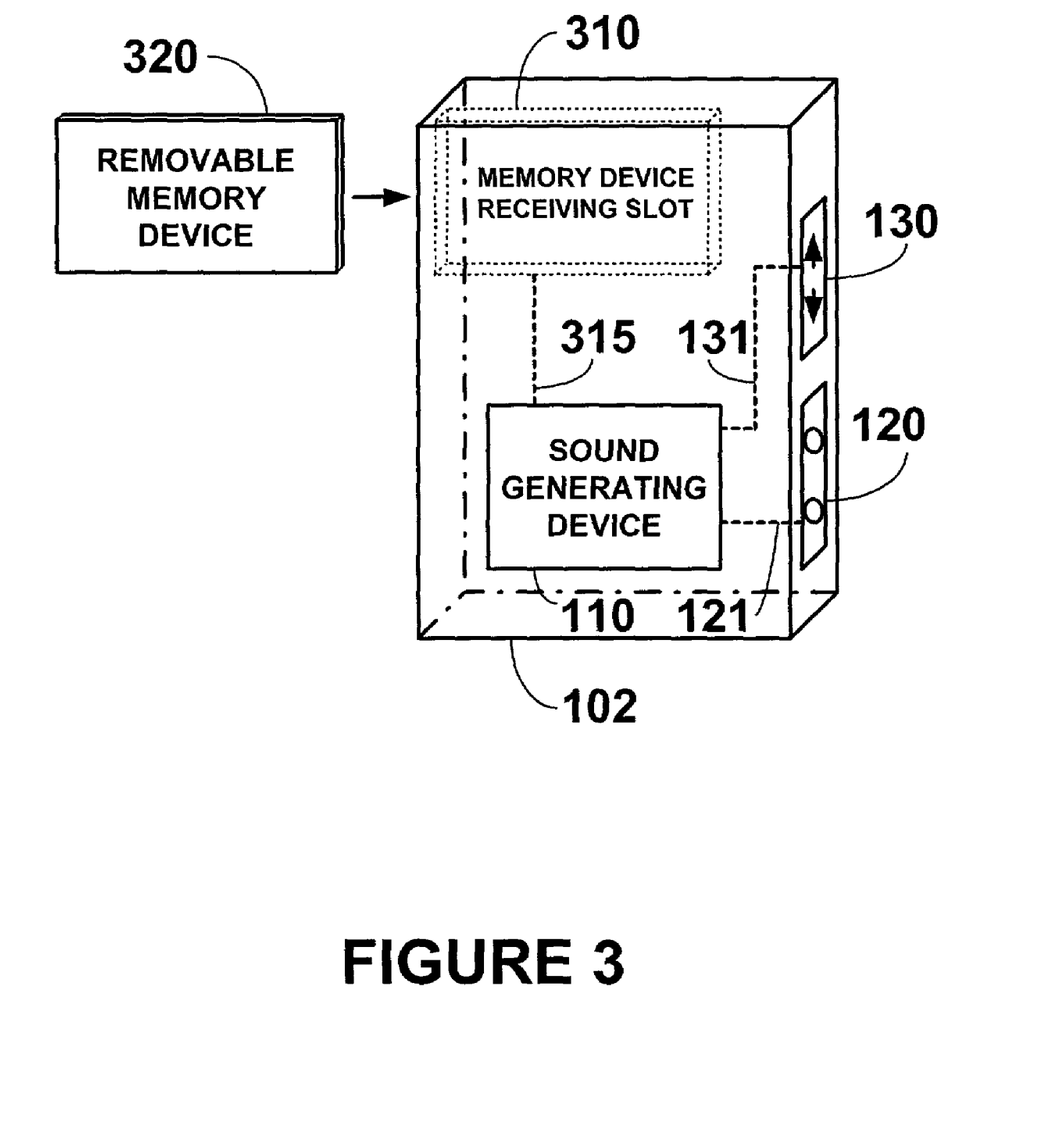
FIG. 3 illustrates a device, according to another exemplary embodiment of the present invention, that allows for changing audio alert signals through removable signal storage devices.

Alternatively, sound generating device 110 may produce one or more audio signals through use of a removable memory device. Another means for programming the audio signal selection of a battery 102 is shown in the exemplary embodiment in FIG. 3 as a device for storing sound files. Such a device may be a removable memory device 320, as shown in FIG. 3, which has been shown without terminal connectors 104 and electrical connectors 105 for sake of clarity. The removable memory device 320 includes one or more sound files that may be transferred to or accessed by the sound generating device 110. The removable memory device 320 is insertable into a memory device receiving slot 310 in the body of the battery 102. The removable memory device 320 is shown as a memory card in FIG. 3 as an example, but other configurations for the memory device 320 are possible, as described below.

The removable memory device 320 may be any medium that is capable of storing one or more sound files and is detachable from the battery 102, such as a memory stick. Alternatively, the removable memory device 320 may be attachable directly to the telephone body 101 through a similar memory receiving slot 310 located directly on the body of the telephone 101. Non-limiting examples of the removable memory device 320 include, but are not limited to, smart media cards, compact flash, memory sticks, minidisks, digital chips, or similar memory storage devices. It would be desirable to use an industry standard technology for the removable memory device 320 to facilitate the universal transferability of stored sound files between different telephone systems 100 capable of receiving the removable memory devices 320.

The sound files may be stored in the removable memory device 320 in any format that allows for the sound files to be accessed. Non-limiting examples of the storage format of the sound files include, but are not limited to, MP3 format, wave format (.wav), MIDI format (.mid), and other similar sound file storing formats.

When the removable memory device 320 is inserted into the receiving slot 310, the sound generating device 110 gains access to the sound files stored in the removable memory device 320 through electrical or optical connection 315. When a user selects sound files through the selector switch 130, the sound generating device 110 accesses and plays the sound files in the removable memory device 320. Alternatively, the sound files stored in the removable memory device 320 may be downloaded onto the memory storage area of the sound generating device 110, from which the user may select a particular sound file through the selector switch 130.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A battery assembly system for a cellular telephone, comprising:
   a first battery for providing power to the cellular telephone and having terminals for establishing an electrical connection with the cellular telephone;
   a first sound generating device attached to the first battery and comprising memory for storing a first sound file downloaded from a removable memory device attachable to the first battery, wherein the first sound generating device is triggered to play a sound alert associated with the first sound file when the first battery is installed in the cellular telephone upon sensing an electrical signal to the first battery produced by the cellular telephone through the terminals upon detection of a telephone call by the cellular telephone and wherein further, the first sound generating device is triggered to play a sound alert associated with the first sound file upon sensing an electrical signal to the first battery produced by the cellular telephone through the terminals due to an event at the cellular telephone other than an incoming telephone call;

a second battery for providing power to the cellular telephone and having terminals for establishing an electrical connection with the cellular telephone;

a second sound generating device attached to the second battery and comprising memory for storing a second sound file downloaded from the removable memory device attachable to the second battery where the second sound file is different from the first sound file, wherein the second sound generating device is triggered to play a sound alert associated with the second sound file when the second battery is installed in the cellular telephone upon sensing an electrical signal to the second battery produced by the cellular telephone through the terminals upon detection of the telephone call by the cellular telephone and wherein further, the second sound generating device is triggered to also play a sound alert associated with the first sound file upon sensing an electrical signal to the second battery produced by the cellular telephone through the terminals due to an event at the cellular telephone other than an incoming telephone call.

2. The battery of claim 1, wherein the first and second sound generating devices store a plurality of sound files where at least some of the plurality of sounds files of the first generating device are different than the plurality of sound files of the second generating device.

3. The battery of claim 2, further comprising:

an external connector socket on the battery in electrical communication with the first or second sound generating devices to provide external access to the plurality of sound files in the first or second sound generating device.

4. The battery of claim 2, further comprising:

a selector device on the first and second batteries battery for scrolling through the plurality of sound files of the first or second battery and designating a sound file to use as an audio alert signal.

5. A battery assembly system for a cellular telephone, comprising:

a first battery for providing power to the cellular telephone and having terminals for establishing an electrical connection with the cellular telephone;

a first sound generating device attached to the first battery, comprising memory for storing at least a first sound file downloaded from a removable memory device attachable to the first battery, wherein the first sound generating device is triggered to play a sound alert associated with the at least the first sound file when the first battery is installed in the cellular telephone upon sensing an electrical signal to the first battery produced by the cellular telephone through the terminals upon detection of a telephone call by the cellular telephone and wherein further, the first sound generating device is triggered to also play a sound alert associated with the first sound file upon sensing an electrical signal to the first battery produced by the cellular telephone through the terminals due to an event at the cellular telephone other than an incoming communication;

a second battery for providing power to the cellular telephone and having terminals for establishing an electrical connection with the cellular telephone;

a second sound generating device attached to the second battery, comprising memory for storing at least a second sound file downloaded from the removable memory device attachable to the second battery where the second sound file is different from the first sound file, wherein the second sound generating device is triggered to play a sound alert associated with the at least the second sound file when the second battery is installed in the cellular telephone upon sensing an electrical signal to the second battery produced by the cellular telephone through the terminals upon detection of the telephone call by the cellular telephone and wherein further, the second sound generating device is triggered to also play a sound alert associated with the second sound file upon sensing an electrical signal to the second battery produced by the cellular telephone through the terminals due to an event at the cellular telephone other than an incoming communication;

an external connector socket on each of the first and second batteries in electrical communication with the first or second sound generating devices to provide external access to the first or second plurality of sound files in the first or second sound generating devices for adding and deleting a sound file; and a selector device on each of the first and second batteries for designating a sound file from the first plurality or from the second plurality to use as an audio alert signal.

6. A battery assembly system for a cellular telephone, comprising:

a first battery providing power to the cellular telephone and having terminals for establishing an electrical connection with the cellular telephone to provide power to the cellular telephone and to receive a signal from the cellular telephone through the same terminals;

a first sound generating device attached to the first battery and comprising memory for storing a first plurality of sound files downloaded from a removable memory device attachable to the first battery, wherein the first sound generating device is triggered to play a sound alert associated with one of the first plurality of sound files when the first battery is installed in the cellular telephone upon sensing an electrical signal to the first battery produced by the cellular telephone through the terminals upon detection of a telephone call by the cellular telephone and wherein further, the first sound generating device is triggered to also play a sound alert associated with the first sound file upon sensing an electrical signal to the first battery produced by the cellular telephone through the terminals due to an event at the cellular telephone other than an incoming telephone call;

a second battery providing power to the cellular telephone and having terminals for establishing an electrical connection with the cellular telephone to provide power to the cellular telephone and to receive a signal from the cellular telephone;

a second sound generating device attached to the second battery and comprising memory for storing a second plurality of sound files downloaded from the removable memory device attachable to the second battery where the second plurality of sound files are different than the first plurality of sound files, wherein the second sound generating device is triggered to play a sound associated with one of the second plurality of sound files when the second battery is installed in the cellular telephone upon sensing an electrical signal to the second battery produced by the cellular telephone through the terminals upon detection of a telephone call by the cellular telephone and wherein further, the second sound generating device is triggered to also play a sound alert associated with the second sound file upon sensing an electrical signal to the second battery produced by the cellular telephone through the terminals due to an event at the cellular telephone other than an incoming telephone call;

accessing means in electrical communication with the first or second sound generating devices for providing external access to the first or second plurality of sound files in the first or second sound generating devices for adding and deleting a sound file; and selecting means on each of the first and second batteries for designating a sound file of the first or second plurality to use as an audio alert signal.

7. A cellular telephone system having changeable audio alert signals, the system comprising:

a cellular telephone body having terminals to receive power and to provide a signal; and a first cellular telephone battery connectable with the cellular telephone body and having terminals for establishing an electrical connection with the terminals of the cellular telephone body to provide power to the cellular telephone and to receive a signal from the cellular telephone through the same terminals and including a first sound generating device comprising memory for storing a first sound file downloaded from a removable memory device attachable to the first battery, wherein the first sound generating device is triggered to play sound alerts associated with the first sound file when the first cellular telephone battery is installed in the cellular telephone body upon sensing an electrical signal to the first battery produced by the cellular telephone through the terminals of the first cellular telephone battery upon detection of a telephone call by the cellular telephone and wherein further, the first sound generating device is triggered to also play sound alerts associated with the first sound file upon sensing an electrical signal to the first battery produced by the cellular telephone through the terminals due to an event at the cellular telephone other than an incoming telephone call;

a second cellular telephone battery connectable with the cellular telephone body and having terminals for establishing an electrical connection with the terminals of the cellular telephone body to provide power to the cellular telephone and to receive a signal from the cellular telephone through the same terminals and including a second sound generating device comprising memory for storing a second sound file from the removable memory device attachable to the second battery where the second sound file is different from the first sound file, wherein the second sound generating device is triggered to play sound alerts associated with the second sound file when the second cellular telephone battery is installed in the cellular telephone body upon sensing an electrical signal produced by the cellular telephone through the terminals of the first cellular telephone battery upon detection of a telephone call by the cellular telephone and wherein further, the second sound generating device is triggered to also play sound alerts associated with the second sound file upon sensing an electrical signal to the second battery produced by the cellular telephone through the terminals due to an event at the cellular telephone other than an incoming telephone call.

8. The system of claim 7, wherein the first and second sound generating devices store a plurality of sound files that are capable of being edited.

9. The system of claim 8, further comprising:

an external connector socket on each of the first and second batteries in electrical communication with the first or second sound generating devices to provide external access to the plurality of sound files in the first or second sound generating devices.

10. The system of claim 8, further comprising:

a computer system having an electrical plug electrically connected to the first or second sound generating devices through the connector socket, for editing the plurality of sound files to add and delete sound files from the first or second sound generating device.

11. The system of claim 8, further comprising:

a selector device on each of the first and second batteries for scrolling through the plurality of sound files and designating a sound file to use as an audio alert signal.

12. A cellular telephone system having changeable audio alert signals, the system comprising:

a cellular telephone body having terminals to receive power and to provide a signal;

a first cellular telephone battery connectable with the cellular telephone body and having terminals for establishing an electrical connection with the terminals of the cellular telephone to provide power to the cellular telephone and to receive a signal from the cellular telephone through the same terminals and including a first sound generating device comprising memory for storing a first sound file downloaded from a removable memory device attachable to the first battery, wherein the first sound generating device stores a first plurality of sound files and is triggered to play a sound alert associated with a designated sound file of the first plurality when the first cellular telephone battery is installed in the cellular telephone body upon sensing an electrical signal to the first battery produced by the cellular telephone through the terminals of the first cellular telephone battery upon detection of a telephone call by the cellular telephone wherein further, the first sound generating device is triggered to also play sound alerts associated with the first sound file upon sensing an electrical signal to the first battery produced by the cellular telephone through the terminals due to an event at the cellular telephone other than an incoming telephone call; and a second cellular telephone battery connectable with the cellular telephone body and having terminals for establishing an electrical connection with the terminals of the cellular telephone to provide power to the cellular telephone and to receive a signal from the cellular telephone through the same terminals and including a second sound generating device comprising memory for storing a second sound file downloaded from the removable memory device attachable to the second battery where the sound file is different from the first sound file, wherein the first sound generating device stores a second plurality of sound files different from the first plurality and is triggered to play a sound alert associated with a designated sound file of the second plurality when the second cellular telephone battery is installed in the cellular telephone body upon sensing an electrical signal to the second battery produced by the cellular telephone through the terminals of the second cellular telephone battery upon detection of the telephone call by the cellular telephone and wherein further, the second sound generating device is triggered to also play a sound alert associated with the second sound file upon sensing an electrical signal to the second battery produced by the cellular telephone through the terminals due to an event at the cellular telephone other than an incoming telephone call.

13. The system of claim 12, further comprising:
an external connector socket on each of the first and second batteries in electrical communication with the first or second sound generating devices to provide external access to the first or second plurality of sound files in the first or second sound generating devices.

14. The system of claim 12, further comprising:
a computer system having an electrical plug electrically connected to the first or second sound generating devices through the connector socket, for editing the first or second plurality of sound files by adding or deleting from the first or second sound generating devices.

15. The system of claim 12, further comprising:
a selector device on each of the first and second batteries for scrolling through the first or second plurality of sound files and designating a sound file to use as an audio alert signal.

16. A cellular telephone system having changeable audio alert signals, the system comprising:
a cellular telephone body having terminals to receive power and to provide a signal;
a first cellular telephone battery connectable with the cellular telephone body and having terminals for establishing an electrical connection with the terminals of the cellular telephone to provide power to the cellular telephone and to receive a signal from the cellular telephone through the same terminals and including a first sound generating device;
a first removable memory device including at least one first sound file, the first memory device being attachable to the first battery, and allowing access to the first sound file from the first sound generating device and wherein the first sound generating device is triggered to play an alert associated with the first sound file when the first cellular telephone battery is installed in the cellular telephone body upon sensing an electrical signal to the first battery produced by the cellular telephone through the terminals of the first cellular telephone battery upon detection of a telephone call by the cellular telephone and wherein further, the first sound generating device is triggered to also play a sound alert associated with the first sound file upon sensing an electrical signal to the first battery produced by the cellular telephone through the terminals due to an event at the cellular telephone other than an incoming telephone call;
a second cellular telephone battery connectable with the cellular telephone body and having terminals for establishing an electrical connection with the terminals of the cellular telephone to provide power to the cellular telephone and to receive a signal from the cellular telephone through the same terminals and including a second sound generating device;
a second removable memory device including at least one second sound file, the second memory device being attachable to the second battery, and allowing access to the second sound file from the second sound generating device and wherein the sound generating device is triggered to play an alert associated with the second sound file when the second cellular telephone battery is installed in the cellular telephone body upon an electrical signal to the second battery produced by the cellular telephone through the terminals of the second cellular telephone battery upon detection of a telephone call by the cellular telephone and wherein further, the second sound generating device is triggered to also play a sound alert associated with the first sound file upon sensing an electrical signal to the second battery produced by the cellular telephone through the terminals due to detection of an event at the cellular telephone other than an incoming telephone call.

17. A cellular telephone system having changeable audio alert signals, the system comprising:
a cellular telephone body having terminals to receive power and to provide a signal;
a first cellular telephone battery connectable with the cellular telephone body and having terminals for establishing an electrical connection with the terminals of the cellular telephone to provide power to the cellular telephone and to receive a signal from the cellular telephone through the same terminals and including a first sound generating device comprising memory for storing a first sound file downloaded from a removable memory device attachable to the first battery, wherein the sound generating device stores a first plurality of sound files and is triggered to play a sound alert associated with a designated sound file when the first cellular telephone battery is installed in the cellular telephone body upon sensing an electrical signal to the first battery produced by the cellular telephone through the terminals of the first cellular telephone battery upon detection of a telephone call by the cellular telephone and wherein further, the first sound generating device is triggered to also play a sound alert associated with the first sound file upon sensing an electrical signal to the first battery produced by the cellular telephone through the terminals due to an event at the cellular telephone other than an incoming telephone call;
a second cellular telephone battery connectable with the cellular telephone body and having terminals for establishing an electrical connection with the terminals of the cellular telephone to provide power to the cellular telephone and to receive a signal from the cellular telephone through the same terminals and including a second sound generating device comprising memory for storing a second sound file downloaded from the removable memory device attachable to the second battery where the second sound file is different from the first sound file, wherein the sound generating device stores a second plurality of sound files different from the first plurality and is triggered to play a sound alert associated with a designated sound file when the second cellular telephone battery is installed in the cellular telephone body upon sensing an electrical signal to the second battery produced by the cellular telephone through the terminals of the second cellular telephone battery upon detection of a telephone call by the cellular telephone and wherein further, the second sound generating device is triggered to also play a sound alert associated with the first sound file upon sensing an electrical signal to the battery produced by the cellular telephone through the terminals due to an event at the cellular telephone other than an incoming telephone call;
an external connector socket on each of the first and second batteries in electrical communication with the first or second sound generating devices to provide external access to the first or second plurality of sound files in the first or second sound generating devices;

a computer system having an electrical plug electrically connected to the first or second sound generating devices through the connector socket, for editing the first or second plurality of sound files by adding, deleting and editing sound files from the first or second sound generating devices; and a selector device on each of the first and second batteries for designating a sound file to use as an audio alert signal.

18. A cellular telephone system having changeable audio alert signals, the system comprising:

a cellular telephone body having terminals to receive power and to provide a signal;

a first cellular telephone battery connectable with the cellular telephone body and having terminals for establishing an electrical connection with the terminals of the cellular telephone to provide power to the cellular telephone and to receive a signal from the cellular telephone through the same terminals and including a first sound generating device comprising memory for storing a first sound file downloaded from a removable memory device attachable to the first battery, wherein the first sound generating device stores a first plurality of sound files and is triggered to play a sound associated with a designated sound file when the first cellular telephone battery is installed in the cellular telephone body upon sensing an electrical signal to the first battery produced by the cellular telephone through the terminals of the first cellular telephone battery upon detection of a telephone call by the cellular telephone and wherein further, the first sound generating device is triggered to also play a sound alert associated with the first sound file upon sensing an electrical signal to the first battery produced by the cellular telephone through the terminals due to an event at the cellular telephone other than an incoming telephone call;

a second cellular telephone battery connectable with the cellular telephone body and having terminals for establishing an electrical connection with the terminals of the cellular telephone to provide power to the cellular telephone and to receive a signal from the cellular telephone through the same terminals and including a second sound generating device comprising memory for storing a second sound file downloaded from the removable memory device attachable to the second battery where the second sound file is different from the first sound file, wherein the second sound generating device stores a second plurality of sound files different from the first plurality and is triggered to play a sound associated with a designated sound file when the second cellular telephone battery is installed in the cellular telephone body upon sensing an electrical signal to the second battery produced by the cellular telephone through the terminals of the second cellular telephone battery upon detection of a telephone call by the cellular telephone and wherein further, the second sound generating device is triggered to also play a sound alert associated with the second sound file upon sensing an electrical signal to the second battery produced by the cellular telephone through the terminals due to an event at the cellular telephone other than an incoming telephone call;

accessing means on each of the first and second batteries and in electrical communication with the first or second sound generating devices to provide external access to the first or second plurality of sound files in the first or second sound generating devices;

programming means, electrically connected to the first or second sound generating devices through the accessing means, for editing the first or second plurality of sound files by adding, deleting and editing a sound file from the first or second sound generating devices; and selecting means on each of the first and second batteries for designating a sound file to use as an audio alert signal.

19. A method of programming designated audio alert signals on a cellular telephone, the method comprising:

providing a first battery for a cellular telephone, the first battery including a first sound generating device and a memory device receiving slot located on an outside surface and having terminals for receiving a signal from the cellular telephone;

providing a second battery for a cellular telephone, the second battery including a second programmable sound generating device and a memory device receiving slot located on an outside surface and having terminals for receiving a signal from the cellular telephone;

providing a removable memory device having at least a first and a second sound file;

inserting the memory device into the memory device receiving slot of the first battery;

accessing the first sound file by the first sound generating device;

selecting the first sound file and designating it as the audio alert signal for the telephone when the first battery is installed in the cellular telephone such that the first sound file alert of the first sound generating device is activated upon sensing an electrical signal to the first battery produced by the cellular telephone through the terminals of the first battery upon detection of a telephone call by the cellular telephone and such that the first sound file alert of the first sound generating devise is activated upon sensing an electrical signal to the first battery produced by the cellular telephone through the terminals due to an event at the cellular telephone other than an incoming telephone call;

inserting the memory device into the memory device receiving slot of the second battery;

accessing the second sound file by the second sound generating device; and selecting the second sound file and designating it as the audio alert signal for the telephone when the second battery is installed in the cellular telephone such that the second sound file alert of the second sound generating device is activated upon sensing an electrical signal to the second battery produced by the cellular telephone through the terminals of the second battery upon detection of a telephone call by the cellular telephone and such that the second sound file alert of the second sound generating device is activated upon sensing an electrical signal to the second battery produced by the cellular telephone through the terminals due to an event at the cellular telephone other than an incoming telephone call.

20. A method of selecting a designated audio alert signal on a cellular telephone, the method comprising:

providing a first battery for a cellular telephone and having terminals for receiving a signal from the cellular telephone, the first battery including a first programmable sound generating device and a selector located on an outside surface, wherein the first sound generating device includes a first plurality of sound files downloaded from a removable memory device connectable to the first battery;

providing a second battery for the cellular telephone and having terminals for receiving a signal from the cellular telephone, the second battery including a second programmable sound generating device and a selector located on an outside surface, wherein the second sound generating device includes a second plurality of sound files downloaded from the removable memory device connectable to the second battery;

for each of the first and second batteries, scrolling through the first and second plurality of sound files with the selector to hear the first and second plurality of sound files;

listening to exemplary sounds of the first and second plurality of sound files;

selecting a selected sound from the first and the second plurality of sound files;

when desiring to hear the selected sound alert from the first plurality during cellular telephone operation, then installing the first battery into the cellular telephone such that the sound file alert of the first sound generating device is activated upon sensing an electrical signal to the first battery produced by the cellular telephone through the terminals of the first battery upon detection of a telephone call by the cellular telephone and such that the first sound file alert of the first sound generating device is activated upon sensing an electrical signal to the first battery produced by the cellular telephone through the terminals due to an event at the cellular telephone other than an incoming telephone call; and when desiring to hear the selected sound alert from the second plurality during cellular telephone operation, then installing the second battery into the cellular telephone such that the sound file alert of the second sound generating device is activated upon sensing an electrical signal to the second battery produced by the cellular telephone through the terminals of the second battery upon detection of a telephone call by the cellular telephone and such that the second sound file alert of the second sound generating device is activated upon sensing an electrical signal to the battery produced by the cellular telephone through the terminals due to an event at the cellular telephone other than an incoming telephone call.

* * * * *